ly along endless guide paths extending parallel
United States Patent

[15] 3,705,779

Zon

[45] Dec. 12, 1972

[54] DEVICE FOR MANUFACTURING A PLASTIC TUBE WITH TRANSVERSE GROOVES

[72] Inventor: Cornelis van Zon, Zwolle, Netherlands

[73] Assignee: Industriele Onderneming Wavin N.V., Zwolle, Netherlands

[22] Filed: Dec. 21, 1970

[21] Appl. No.: 100,302

[30] Foreign Application Priority Data

Dec. 22, 1969 Netherlands..............6919232

[52] U.S. Cl. ...................425/326, 425/370, 264/94, 264/167
[51] Int. Cl..............................................B29c 17/07
[58] Field of Search....18/14 G, 14 RR, 14 R, 19 TC; 264/94, 167, DIG. 52; 425/326, 336, 364, 369, 370, 371, 393

[56] References Cited

UNITED STATES PATENTS

| 3,188,690 | 6/1965 | Zieg.....................18/19 TC X |
| 3,243,850 | 4/1966 | Zieg.....................264/DIG. 52 |
| 3,391,424 | 7/1968 | Drossbach..............18/19 TC |
| 3,021,571 | 2/1962 | Jackson et al. .....264/DIG. 52 |

*Primary Examiner*—Robert L. Spicer, Jr.
*Attorney*—Woodhams, Blanchard and Flynn

[57] ABSTRACT

A device for continuously manufacturing a plastic tube with helical grooves comprising an extruder with an annular nozzle situated between a casing and a core, and two rows of mould halves, each row being movable along endless guide paths extending parallel to each other in an operative track, opposite mould halves in this track completing one the other by their mould cavities so as to form a hollow mould, the core of the annular nozzle being provided with a continuous bore for introducing a gaseous pressure between the annular nozzle and closing means consisting of a number of discs of flexible material, whereby the discs have a diameter such that helical grooves are closed when a plastic tube is provided with grooves in the moulds.

9 Claims, 3 Drawing Figures

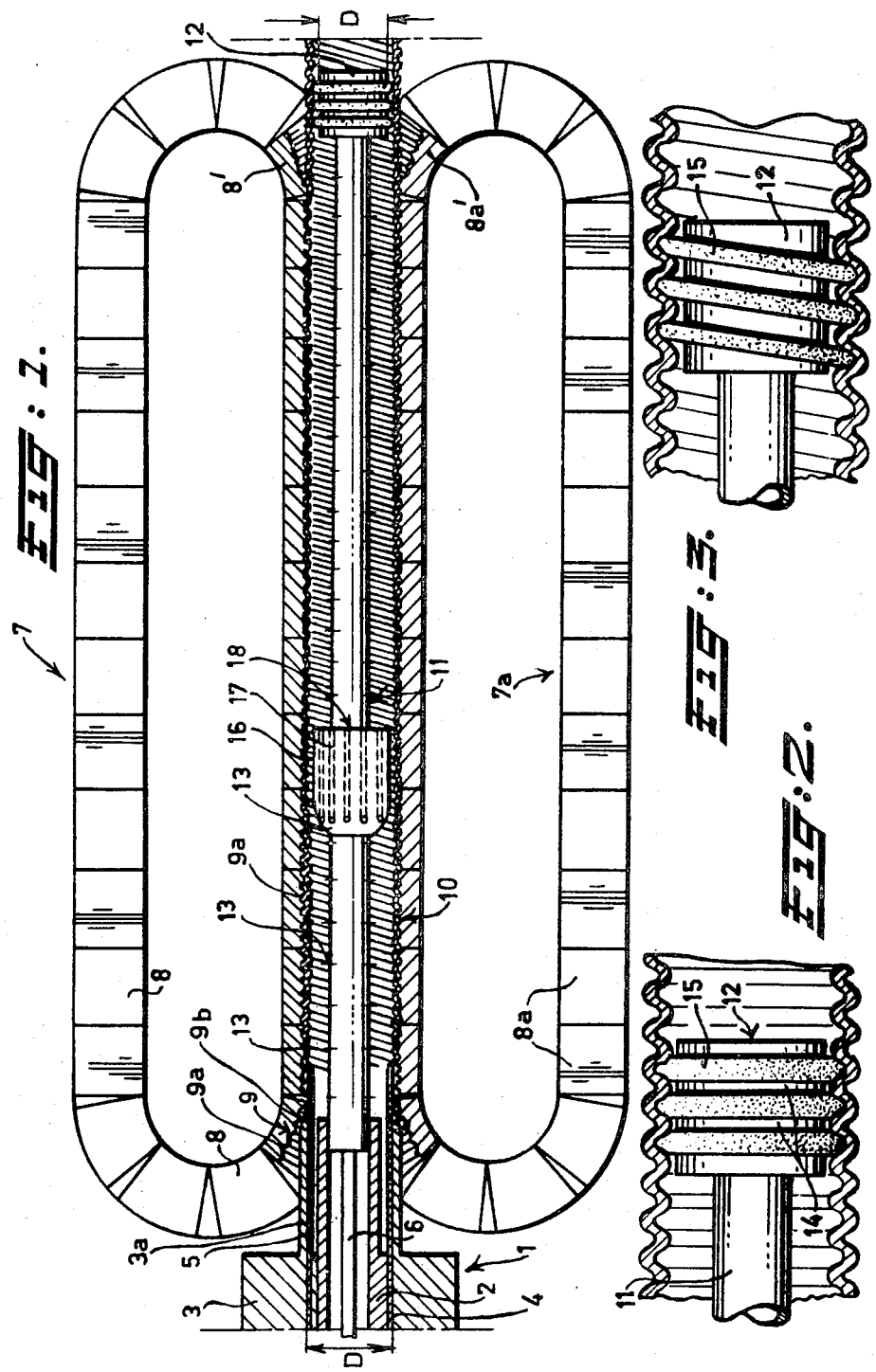

DEVICE FOR MANUFACTURING A PLASTIC TUBE WITH TRANSVERSE GROOVES

My invention relates to a device for manufacturing a plastic tube with transverse grooves at least comprising an extruder with an annular nozzle, situated between a casing and a core, and a number of mould halves, directly adjoining each other, each mould half having a semi tubular mould cavity provided with a ribbed profile, comprising wave valleys and wave tops, which mould halves are movable along endless guide paths extending parallel to each other in an operative track, opposite mould halves in this track completing each other by their cavity so as to form a hollow mould, and of a closing means retained in spaced relationship from the core, the core of the annular nozzle being provided with a continuous bore for introducing a gaseous pressure medium between the annular nozzle and the closing means.

Such a device for manufacturing a plastic tube with transverse grooves is known, whereby the gaseous pressure medium presses the tube against the wall surface of the mould halves.

The closing means have such dimensions that in operation the distance between same and the opposite wave tops of the rib profiles, provided in the mould halves, is almost filled up by the wall thickness of the plastic tube.

Serious difficulties are however experienced as soon as in such a device for manufacturing plastic tube with helically extending grooves a corresponding helically extending rib profile is provided. In such a case owing to the presence of the helically extending grooves compressed air can escape from the part of the tube between the extrusion head and the closing means, so that one is obliged to introduce, via the bore through the extruder head, rather large quantities of air into the tube to be formed. Then large quantities of air pass through the bore in the extrusion head and same cools down fast, so that it is not possible to extrude a proper plastic tube. In many cases clefts are formed in the extruded tube, so that it is unfit for use.

It is now an object of the invention to avoid these difficulties by providing the mould segments with a helically extending rib profile, and the greatest outer diameter of the closing means being at least equal to the diameter of the cylinder formed by the bottom of the valleys of the helical rib profile in the mould segment minus twice the wall thickness of the grooved tube to be formed, and at least the part of the closing means situated outside the surface of a cylinder with a diameter at most equal to the smaller inner diameter of the rib profile of two cooperating mould halves minus twice the wall thickness of the grooved tube to be formed, is constructed in such a way that at least the cross section of one groove of a tube to be formed is continuously substantially closed.

Generally the greatest outer diameter of the closing means is at least equal to the diameter of the cylinder formed by the bottoms of the valleys of the helical rib profile minus the distance between the casing and the core, and at least the part of the closing means situated outside the surface of the cylinder and with a diameter corresponding with the diameter of the core consists of deformable material.

The closing means consists advantageously of two or more metal plates, with a diameter which substantially corresponds to the diameter of the core, and retained thereinbetween a disc, or discs of deformable material, like e.g., rubber, the outer diameter of which is substantially equal to the diameter of the cylindrical surface constituted by the wave valleys of the rib profile minus the distance between the core and casing.

It is advisable to impart a helical configuration to the deformable material, which corresponds to the helical shape of the rib profile in the mould halves.

By using said closing means the helically extending groove or grooves in the tube are closed or at least partially closed, so that now with a small quantity of air or other pressurized medium the desired deformation can be obtained and the aforementioned undesired cooling of the annular nozzle does not appear.

The invention is hereinafter clarified with reference to the drawing in which an embodiment of the invention is represented.

In the drawing:

FIG. 1 shows diagrammatically a device according to the invention,

FIG. 2 is a detail of a closing means consisting of straight discs of a deformable material:

FIG. 3 is a detail of a closing means with parts of a deformable material adapted to the helical shape. For reasons of clarity the tube 5 left of the closing means in FIG. 2 and 3 is shown in the original extruded non deformed shape but it will be obvious that normally this part is provided with corrugations.

The device according to FIG. 1 shows an extruder 1, provided with an extrusion head consisting of a core 2 and a casing 3 whereinbetween is situated an annular nozzle 4 for extending a plastic tube 5. The core 2 is provided with a continuous bore 6 for passing through compressed air as a pressure medium for deforming the plastic tube.

The device is further provided with two endless rows 7, 7a of mould halves directly adjoining each other, each mould half 8, 8a of which has a semi tubular mould cavity provided with a ribbed profile 9, the consecutive ribbed profiles constituting a helical profile. This ribbed profile has wave valleys 9a and wave tops 9b, the bottom of the wave valleys 9a being situated on a cylindrical surface. Over a particular part of the path of the endless rows 7, 7a same cooperate and in this operative track the mould halves 8, 8a constitute a hollow mould 10.

The core 2 carries, by means of a hollow rod 11, a closing means 12. Apertures 13 are provided in the hollow rod through which by way of the bore 6 compressed air can escape. The closing means in FIG. 2 is constructed as a number of metal discs 14 whereinbetween circular rubber discs 15 are clamped. The outer diameter of these rubber discs 15 is at least equal to the diameter of the cylinder, on which lie the bottoms of the wave valleys 9a of the ribbed profile 9, minus twice the thickness of the plastic tube 5, which is determined generally by the difference between the outer side of the core 2 and the inner side of the casing 3. The last remarks hold only for devices whereby the smaller diameter of the mould constituted by two cooperating mould halves is equal to the inner diameter of the casing 3. The casing can also be provided with a lengthened part 3a which preferably extends as far as the effective portion of the mould halves which prevents undesired deformation in the region between the mould halves and the nozzle.

In FIG. 3 the closing means is provided with helically extending discs of deformable material, preferably a continuous helical rubber strip.

Obviously it is also possible to use inflated deformable discs which in that case evidently also consist of a deformable elastic material.

The material used for closing the grooves that is to say the material of the discs may consist of e.g., rubber, plastic, foam rubber and other elastically deformable materials.

The metal discs 14 may have a diameter equal to the diameter of the core 2, but this is not absolutely necessary. Generally the diameter of the metal discs is smaller than the diameter of the core.

It will be appreciated that in case of a sufficient deformability of the material used for the discs 15 one is not bound to a particular outer diameter, provided of course the outer diameter is at least equal to the diameter of the cylinder on which lie the bottom of the wave valleys 9a minus twice the wall thickness of the extruded tube.

In order to avoid the exposure of the closing means 12 to too high temperatures it is advisable to dispose same outside that track where the mould halves cooperate. In order to ensure that no deformation is produced outside the track 7, 7a of the cooperating mould halves 8, 8a they are advantageously cooled. This may e.g., be effected by connecting the mould halves to a cooling means. More closing means may be provided, in which case it is however necessary that at least one of the closing means meets the requirement that same has on its outer side deformable material for sealing the grooves in a substantially gastight way.

It will be obvious that also some mould halves situated before the mould halves 8, 8a' can be constructed in such a way that they are capable of being cooled. See for instance the British Pat. application No. 888,615.

In order to manufacture a plastic tube with helically extending grooves a cylindrical tube 5 is extruded via an annular nozzle 4, which tube is guided over the closing means 12. Thereupon compressed air is introduced via the bore 6 which can escape through the bores 13 in the plastic tube part closed by the closing means 12. It has appeared that in this case a small overpressure, with a moderate supply of air, suffices to deform the tube.

It is recommended to provide the hollow rod 11 also with an additional cylindrical plug 18 which may have longitudinal bores 17. The diameter of wall 16 of plug 18 is e.g., about the same as the diameter of metal discs 14.

It will be obvious that instead of three rubber discs, the number of rubber discs is not restricted to three. However, the number of discs should always be sufficient to close the grooves sufficiently. The rubber discs are e.g., foam rubber discs but foam plastic discs are also suitable.

Advantageously the closing means 12 are displaceable in the axial direction between the nozzle 4 and a position as shown in FIG. 1. This is accomplished by providing the rod 11 with a stop (not shown), which prevents further displacement of the closing means 12.

It is also possible to use fixed closing means 12 and to provide a displaceable cylindrical plug 18.

In those cases the additional plug might consist of a cylindrical plug 18, the end 13 of the cylindrical plug 18 directed to the side of the nozzle 4 being provided with a half of a sphere having the same diameter as the diameter of the cylindrical part.

To start the apparatus, the plug 18 or the closing means 12 are pushed against the nozzle core.

The tube of thermoplastic material surrounds the plug 18 or the closing means 12, and inflation of the tube will now begin. The moulding segments coming into contact with the plug 18 or closing means 12 will move the parts 12 or 18 until a stop on the rod 11 is reached. The tube will now slide over the plug 18 or closing means 12 and the production is started.

The use of a displaceable plug 18 or closing means 12 prevents collapse of the extruded tube before same has reached a fixed plug 18 or closing means 12 at distance from the nozzle.

Instead of a semi spherelike part 13 it is also possible to use a plug 18 with a frustoconical end 13.

What I claim is:

1. In a device for manufacturing a plastic tube with transverse grooves, said device including an extruder having an annular nozzle situated between a casing and a core, mould halves directly adjoining each other, each mould half having a substantially semicylindrical mould cavity provided with a ribbed profile having wave valleys and wave tops, said mould halves being movable along endless guide paths having portions extending parallel to each other in an operative track, the opposite mould halves completing one the other by their partial mould cavities so as to form an elongated substantially cylindrical hollow mould cavity, and closing means retained within said cylindrical mould cavity in spaced relationship from the core, the core of the annular nozzle being provided with a bore for introducing a gaseous pressure medium between the annular nozzle and the closing means, comprising the improvement wherein the mould halves are provided with a helically extending rib profile to form a helical groove in said plastic tube, and the closing means including seal means having an outer diameter at least equal to the diameter of the cylinder formed by the bottoms of the valleys of the helical rib profile in the mould halves minus the wall thickness of the grooved tube formed within the cylindrical mould cavity, said seal means extending into and completely closing the helical groove within said tube to prevent the gaseous pressure medium from escaping past said closing means.

2. A device according to claim 1, wherein said seal means is constructed of an elastically deformable material.

3. A device according to claim 2, wherein the deformable material has a helical profile corresponding to the helical rib profile formed in the mould halves.

4. A device according to claim 2, wherein said seal means is constructed of rubber or plastic.

5. A device according to claim 1, wherein said closing means comprises a plurality of metal plates having a diameter substantially equal to the diameter of the core, and said seal means including at least one disk of deformable material retained between said metal plates.

6. A device according to claim 1, wherein said closing means is disposed adjacent one end of the parallel portions of said guide path, and said nozzle is disposed adjacent the other end of said parallel portions of said guide path, said closing means being disposed outwardly of the track defined by said parallel portions of said guide path, and positioned for sealing engagement with the tube at a location wherein the tube is no longer contacted by the mould halves.

7. A device according to claim 1, further including cylindrical plug means positioned within the tube formed by said mould halves, said cylindrical plug means being disposed axially between said closing means and said nozzle.

8. A device according to claim 7, wherein at least one of said closing means and said plug means is axially displaceable along a hollow rod which extends axially of said tube and is interconnected to said core.

9. A device according to claim 7, wherein said cylindrical plug means is provided with a plurality of longitudinal bores.

* * * * *